United States Patent
Baek et al.

(10) Patent No.: US 8,528,035 B2
(45) Date of Patent: Sep. 3, 2013

(54) METHOD OF PROVIDING DIGITAL TV APPLICATION

(75) Inventors: Wonjang Baek, Seongnam-si (KR); John Kim, Seoul (KR); Seong Baek Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 332 days.

(21) Appl. No.: 12/450,067

(22) PCT Filed: Mar. 21, 2008

(86) PCT No.: PCT/KR2008/001617
§ 371 (c)(1),
(2), (4) Date: Sep. 10, 2009

(87) PCT Pub. No.: WO2008/115032
PCT Pub. Date: Sep. 25, 2008

(65) Prior Publication Data
US 2010/0095341 A1   Apr. 15, 2010

(30) Foreign Application Priority Data

Mar. 22, 2007 (KR) .................. 10-2007-0027895

(51) Int. Cl.
*H04N 7/173* (2011.01)
*G06F 3/00* (2006.01)

(52) U.S. Cl.
USPC ........... 725/112; 725/109; 725/110; 725/132; 725/140; 725/32; 719/320; 719/328

(58) Field of Classification Search
None
See application file for complete search history.

(56) References Cited

U.S. PATENT DOCUMENTS

| | | | | |
|---|---|---|---|---|
| 7,216,170 | B2* | 5/2007 | Ludvig et al. | 709/225 |
| 7,941,564 | B2* | 5/2011 | Gebhardt et al. | 709/248 |
| 7,984,468 | B2* | 7/2011 | Westberg | 725/46 |
| 2002/0092017 | A1* | 7/2002 | Klosterman et al. | 725/35 |
| 2003/0217369 | A1* | 11/2003 | Heredia | 725/152 |
| 2004/0078829 | A1* | 4/2004 | Patel et al. | 725/135 |
| 2005/0028206 | A1* | 2/2005 | Cameron et al. | 725/46 |
| 2007/0022434 | A1* | 1/2007 | Oh | 725/32 |
| 2010/0043043 | A1* | 2/2010 | Baek et al. | 725/116 |
| 2010/0180295 | A1* | 7/2010 | Ratsch et al. | 725/34 |
| 2011/0219419 | A1* | 9/2011 | Reisman | 725/112 |

* cited by examiner

*Primary Examiner* — Nasser Goodarzi
*Assistant Examiner* — Fred Peng
(74) *Attorney, Agent, or Firm* — Stein IP, LLC

(57) ABSTRACT

A method of providing a digital TV application is disclosed. In accordance with the method of the present invention, a transmission time and a loading time of the digital TV application and a limitation on a number and a size of the digital TV application are minimized, providing a personalized digital TV application based on a receiver information or a user information is possible.

11 Claims, 2 Drawing Sheets

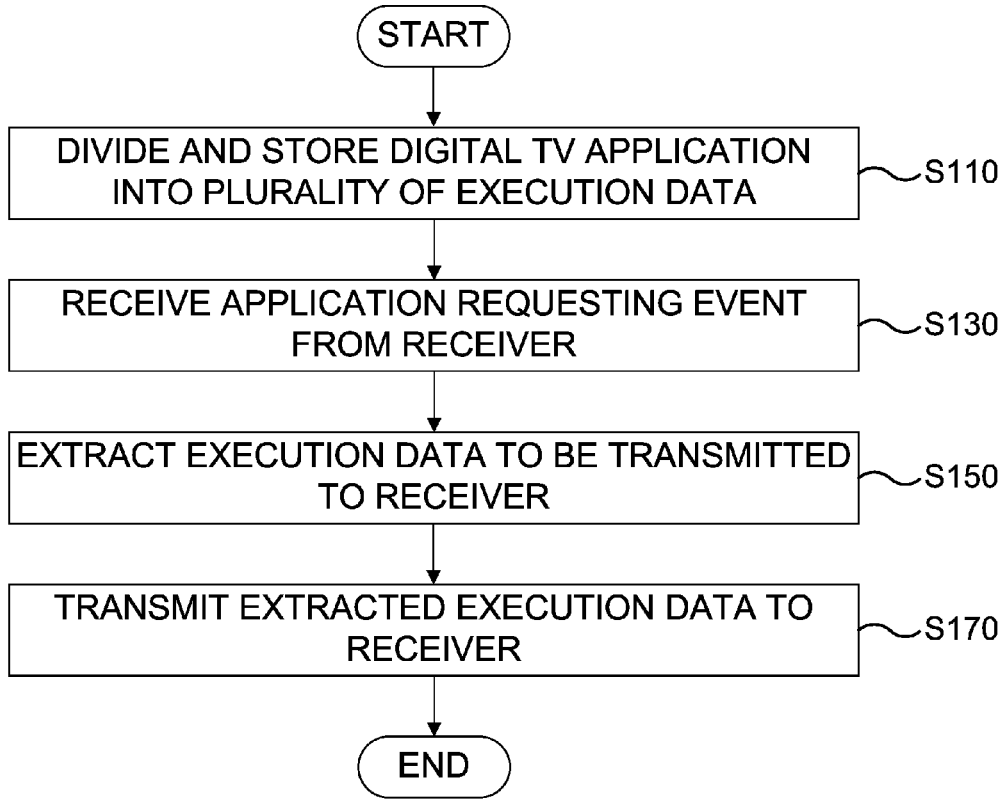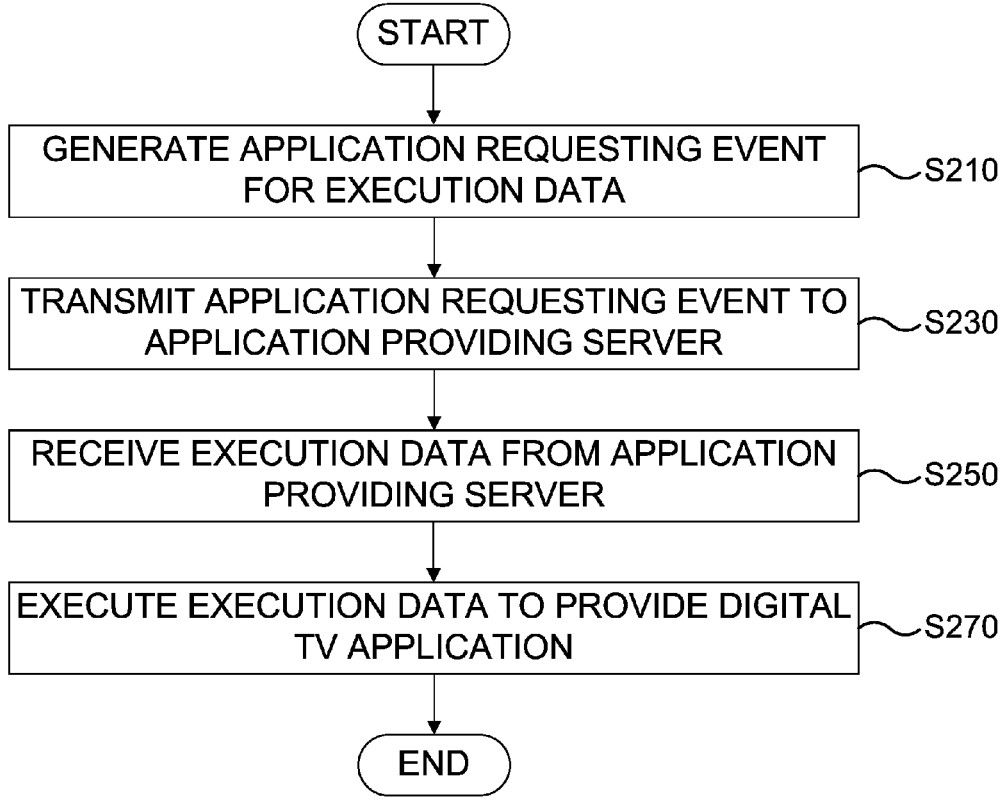

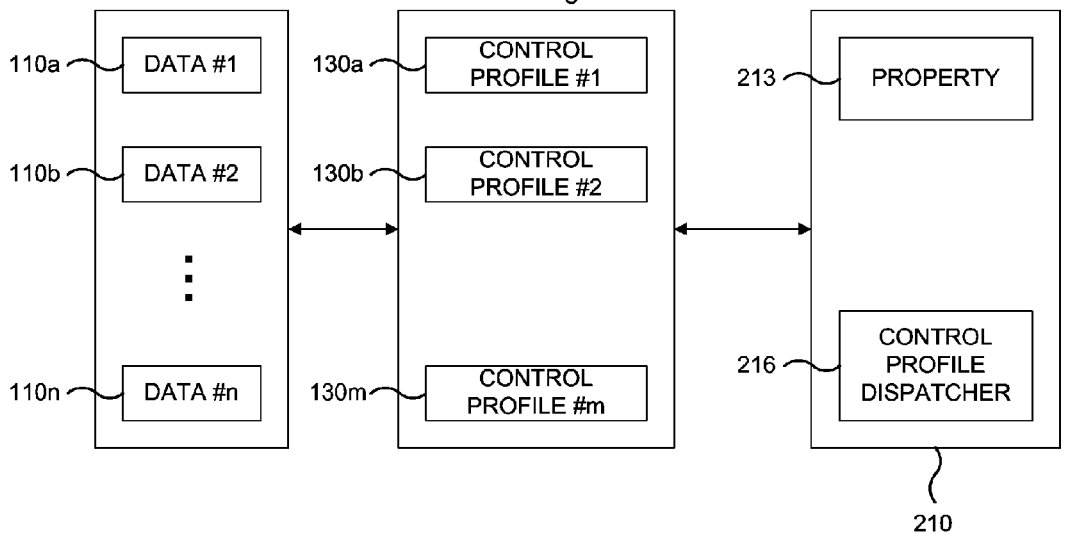
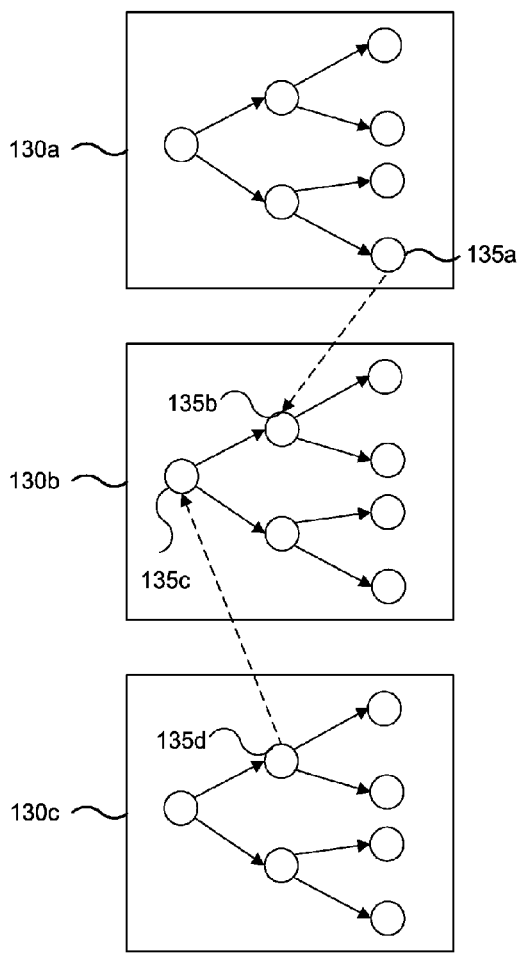

METHOD OF PROVIDING DIGITAL TV APPLICATION

This is a National Phase Application filed under 35 USC 371 of International Application No. PCT/KR2008/001617, filed on Mar. 21, 2008, which claims foreign priority benefit under 35 USC 119 of Korean Application No. 10-2007-0027895, filed on Mar. 22, 2007, the entire content of each of which is hereby incorporated herein by reference in its entirety.

TECHNICAL FIELD

The present invention relates to a method of providing a digital TV application, and more particularly to a method of providing a digital TV application that minimizes a transmission time and a loading time of the digital TV application and a limitation on a number and a size of the digital TV application, and that is capable of providing a personalized digital TV application based on a receiver information or a user information.

BACKGROUND ART

An environment of a broadcasting is changing as a technology progresses and a demand of a viewer changes. Recently, an analog broadcasting is switched to a digital broadcasting, and a broadcast medium is diversified from a terrestrial broadcasting to a cable broadcasting, a satellite broadcasting and an IP-TV service using a high speed communication network.

The digital broadcast is capable of providing additional services in various filed such as sports, movies, home shoppings and musics because a capacity thereof is four to eight times that of the analog broadcasting. A wide variety of choices for the viewer is also provided since various types of the broadcasting such as the cable broadcasting, the satellite broadcasting, a DMB (Digital Multimedia Broadcasting) and the IP-TV are possible.

In addition, under a digital broadcasting environment, a digital TV application may be transmitted as well as a conventional TV program signal, and an interactivity may be embodied by associating with a communication network. Various data services using the digital TV application is expected to play an important role in spreading the digital broadcasting since the viewer may easily use the digital TV application.

However, the provision of the digital TV application in accordance with an conventional art wherein the digital TV application is transmitted to a receiver via a broadcasting network and the receiver executes the digital TV application to be provided to the viewer has following drawbacks.

A head-end system is a system of a digital broadcasting provider for transmitting the TV program signal including audio/video data and the digital TV application to the receiver via the broadcasting network.

Herein, the broadcasting network refers to various broadcasting networks such as a terrestrial broadcasting network, a cable broadcasting network, a satellite broadcasting network, an IP-TV service using the high speed communication network, and a DMB network.

The receiver decodes the broadcast program signal and the digital TV application received from the head-end system to be provided to the viewer. For instance, the receiver may be a digital TV or a set-top box in compliance with the terrestrial broadcasting specification such as the ATSC and interactive data broadcasting specification such as DASE in case of a terrestrial digital broadcasting. The receiver may be a set-top box supporting the broadcasting specification such as Open-Cable and DVB and a data broadcasting specification suitable for the broadcasting network such as OCAP and MHP in case of the cable broadcasting or the satellite broadcasting. The receiver may be a set-top box or a mobile communication terminal supporting a corresponding data broadcasting specification in case of the IP-TV or the DMB.

The receiver may be embodied in a form of the set-top box, the television or a display device. In case of the set-top box, the receiver is connected to the display device to provide the digital broadcasting. In case of the DMB, the receiver may be is built into the mobile communication terminal or an independent DMB receiver. The receiver may be embodied in a form of a PC peripheral when the digital broadcasting is received by a personal computer. When the digital broadcasting is received by the personal computer, the digital broadcasting may be provided on a monitor connected to the personal computer.

However, when the digital TV application is transmitted via the broadcasting network, the digital TV application for a plurality of broadcasting channels are transmitted to the receiver.

For instance, the digital TV application is generally transmitted using a DSM-CC data/object carousel in the terrestrial broadcasting. In addition, the digital TV application is transmitted using an IP multicast scheme in the IP-TV.

Therefore, a number of the digital TV application is limited, and a size and a configuration the digital TV application are also limited.

For instance, a size of a data of the digital TV application corresponding to an HD broadcasting is larger than that of an SD broadcasting.

Therefore, the digital TV application corresponding to the HD broadcasting requires a large bandwidth for transmission, and the number of the digital TV application that can be transmitted via the broadcasting network is smaller than that of the SD broadcasting. In addition, a screen configuration or a scene configuration should be minimized such that the digital TV application can be transmitted within the usable bandwidth. Accordingly, various configurations cannot be used for the digital TV application corresponding to the HD broadcasting.

That is, because the digital TV application is transmitted using a limited resource, the number of and the configuration of the digital TV application are limited.

Therefore, a personalized digital TV application cannot be provided for the viewer.

Moreover, a long time is required from selecting of the digital TV application to loading of the digital TV application.

That is, when the head-end system transmits the digital TV application, the head-end system divides the digital TV application into packets having affixed size similar to the transmission of a conventional TV program packet. The receiver combines the received packets to generate the digital TV application. When the packet is lost during the transmission, the digital TV application cannot be executed for some cases.

A video data included in a digital broadcast program may be reproduced even when a portion of packets is lost by ignoring the lost packets and using other packets. However, the digital TV application cannot be executed when a portion of the packets thereof is lost. Therefore, an entirety of the data application should be re-transmitted, re-received and re-executed when an error occurs.

In addition, when the receiver receives the packet of the digital TV application, the packet should be combined according to a predetermined order, thereby required an additional time for the combination.

Moreover, even after the combination of the packets is complete, the digital TV application cannot be loaded dividedly, and the entirety of the digital TV application should be loaded and executed. Therefore, an execution speed is slow and a resource of the receiver is excessively used.

Due to above-described problems, the time required for receiving, executing and providing the digital TV application is 10 to 30 seconds. Therefore, it is very inconvenient for the viewer.

Particularly, in case of a broadcast network using the communication network such as the IP-TV, a TV program for a channel requested by the receiver and the digital TV application corresponding to the channel are provided to the receiver from the head-end system rather than providing an entirety of the channel and the digital TV application. Such configuration using the communication network may be used for the cable broadcasting, the terrestrial broadcasting, the satellite broadcasting using the return channel and the DMB in order to provide more channels.

In accordance with the configuration, the changing of the channel is notified to the head-end system, and the head-end system extracts the TV program and the digital TV application for the corresponding channel to be transmitted to the receiver. The receiver receives and provides the TV program and the digital TV application.

Therefore, the head-end system should additionally carry out a switching of the TV program and the digital TV application for the corresponding channel to correspond to the changing of the channel.

Because the time for receiving the digital TV application by the receiver and providing the received digital TV application to the viewer to correspond to the changing of the channel includes time for switching in the head-end system, more than 30-40 seconds of time are required to provide the digital TV application in the receiver. Therefore, it is very inconvenient for the viewer.

Moreover, the execution of the digital TV application is limited by a processing capacity or a storage capacity of the receiver.

That is, when a size of the digital TV application is too large, the digital TV application cannot be executed. Therefore, the number of and the configuration of the digital TV application are limited.

In addition, in accordance with the conventional art, the digital TV application is provided independently for each of the channels.

For instance, the digital TV application associated with the TV program is transmitted only for the corresponding TV program and is executed within the corresponding TV program.

Moreover, in case of the digital TV application provided independently as a data channel, the digital TV application may only be used in the corresponding data channel.

Therefore, a size of the digital TV application that may be executed in a single channel is limited.

For instance, in case a portal service function is embodied using the digital TV application, the digital TV application should have multiple functions in order to provide the portal service.

That is, the digital TV application for providing the portal service should have various functions such as a T-commerce function, a game function, a stock service function and a financial service function.

However, when the single digital TV application is configured to include the various functions, the digital TV application cannot be provided through the single channel due to an excessive size thereof. Moreover, the digital TV application cannot be executed in the receiver. Even when the resource of the receiver is sufficient to execute the digital TV application having the excessive size, a transmission time for transmitting the digital TV application from the head-end system to the receiver and a loading time for the receiver to load the digital TV application are increased. Therefore, the digital TV application having the various functions cannot be applied.

In addition, when the digital TV application is divided according to the function, i.e. is divided into the digital TV application for the portal function, the digital TV application for the T-commerce function, the digital TV application for the game function, the digital TV application for the stock service function and the digital TV application for the financial service function, and transmitted through a same or a different channel, the limit on the resource of the receiver may be reduced. However, the transmission time for transmitting the digital TV application from the head-end system to the receiver cannot be reduced.

Therefore, the digital TV application having the various functions so-called "mega channel service" cannot be provided.

DISCLOSURE OF INVENTION

Technical Problem

It is an object of the present invention to provide a method for providing a digital TV application that minimizes a transmission time and a loading time of the digital TV application and a limitation on the number and a size of the digital TV application, and that is capable of providing a personalized digital TV application based on a receiver information or a user information.

Technical Solution

In order to achieve above-described object of the present invention, there is provided a method for providing a digital TV application in an application providing server for providing the digital TV application, the method comprising steps of: (a) dividing the digital broadcasting application into a plurality of execution data and storing the plurality of execution data; (b) receiving an application requesting event transmitted from a receiver, the receiver executing and providing the digital broadcasting application; (c) extracting one of the plurality of execution data to be provided to the receiver, the extracted execution data corresponding to the application requesting event; and (d) transmitting the execution data extracted in the step (c) to the receiver.

Preferably, each of the plurality of the execution data includes at least one of an executable code, a display data and a resource data for an initial screen of the digital TV application.

Preferably, the step (b) comprises: (b-1) receiving the application requesting event including at least one of a channel identification information for a channel, a device identification information for the receiver, a user identification information for a user of the receiver, and an identification information for the execution data.

Preferably, the step (c) comprises (c-1) extracting one of the plurality of the execution data to be provided to the receiver based on at least one of the channel identification information, the device identification information, the user identification information and the identification information for the execution data.

Preferably, the method in accordance with the present invention further comprising (e) storing a plurality of control profiles including a plurality of control nodes corresponding to a plurality of scenarios for the application requesting event, and the step (c) comprises (c-2) extracting one of the plurality of the execution data to be provided to the receiver based on one of the plurality of control profiles suitable for the application requesting event.

Preferably, the control node includes an identification information for one of the plurality of the execution data to be provided to the receiver.

Preferably, a first control node included in a first control profile of the plurality of control profiles is associated with one of: the execution data corresponding the first control node; a second control profile of the plurality of control profiles different from the first control profile; and a second control node included in the second control profile different from the first control node.

Preferably, each of the plurality of the control profile or each of the plurality of the control node is represented by an identifier, and the association is represented in a form of a link to the identifier.

There is also provided a method for providing a digital TV application in a receiver for receiving providing the digital TV application, the method comprising steps of: (a) generating an application requesting event for requesting an execution data, the execution data classified according to a scene of the digital TV application for executing the digital TV application; (b) transmitting the application requesting event to the application providing server for providing the digital broadcasting application; (c) receiving the execution data corresponding to the application requesting event transmitted from the application providing server; and (d) executing the execution data to provide the digital TV application.

Preferably, the step (a) comprises: (a-1) generating the application requesting event including at least one of a channel identification information of a current channel, a user input information within the current channel, a device identification information of the receiver, a user identification information of a user of the receiver, and an identification information of the execution data.

Preferably, the execution data includes at least one of an executable code, a display data and a resource data for the scene of the digital TV application.

Advantageous Effects

As described above, the method for providing the digital TV application in accordance with the present invention is advantageous in that a transmission time and a loading time of the digital TV application and a limitation on the number and a size of the digital TV application are minimized, and the personalized digital TV application may be provided based on the receiver information or the user information.

BRIEF DESCRIPTION OF THE DRAWINGS

FIG. 1 is a flow diagram exemplifying a method for providing a digital TV application in accordance with the present invention.

FIG. 2 is a flow diagram exemplifying another method for providing a digital TV application in accordance with the present invention.

FIG. 3 is a diagram illustrating a concept of providing a digital TV application between an application providing server and a receiver in accordance with a method for providing a digital TV application of the present invention.

FIG. 4 is a diagram illustrating a concept of a control profile in accordance with a method for providing a digital TV application of the present invention.

DESCRIPTION OF THE REFERENCE NUMERALS

| 110: data | 130: control profile |
|---|---|
| 135: control node | 210: model |
| 213: property | 216: control profile dispatcher |

BEST MODE FOR CARRYING OUT THE INVENTION

A method for providing a digital TV application in accordance with the present invention will now be described in detail with reference to the accompanied drawings.

FIG. 1 is a flow diagram exemplifying a method for providing a digital TV application in accordance with the present invention wherein the method is embodied in an application providing server for providing the digital TV application.

Referring to FIG. 1, the application providing server divides the digital TV application into a plurality of execution data and stores the plurality of execution data (S110).

Each of the plurality of the execution data may include at least one of an executable code, a display data and a resource data for each scene of the digital TV application.

The executable code is an independently executable code to correspond to the scene. That is, the executable code is independently executable for each scene contrary to that of the conventional art that is executable for the entirety of the digital TV application. Therefore, the executable code is required for each scene of the digital TV application.

The display data is an element displayed on a screen when the digital TV application is executed wherein a plurality of scenes corresponding to a user input are divided and stored according to the user input for each scene.

The resource data refers to a data that may be additionally displayed such as a control box, a text box and an image other than the display data.

In accordance with the conventional art, the executable code, the display data and the resource data are integrated into the digital TV application. Therefore, the entirety of the digital TV application transmitted from the head-end system to the receiver to be executed.

However, in accordance with the present invention, the separate application providing server carries out the transmission of the digital TV application and divides and stores the digital TV application for each scene. That is, the application providing server divides the digital TV application stores the digital TV application by dividing the digital TV application into the plurality of the execution data including at least one of the display data, the resource data and the executable code for each scene instead storing the digital TV application as a whole.

Since the digital TV application is stored as the plurality of the execution data, the transmission and the execution per execution data are possible.

Although not shown, the application providing server may store, in advance, a plurality of control profiles for extracting the execution data to correspond to the plurality of execution data constituting the digital TV application.

Each of the plurality of control profiles includes a plurality of control nodes corresponding to a plurality of scenarios. The control profile defines a scheme on extracting the plurality of execution data stored in the step S110.

The control profile may be configured for each channel.

For instance, a control profile A is stored for a channel A and a control profile B is stored for a channel B.

The control profile includes the plurality of control nodes corresponding to the plurality of scenarios for the application requesting event. The execution data to be transmitted is extracted based on the corresponding control node.

In addition, the control profile may be configured based on a user group information in order to provide a personalized service.

For instance, a control profile D may be stored for a user group D and a control profile E may be stored for a user group E.

The control profile based on the user group information may be configured to extract the execution data to be transmitted to the receiver, and be used in order to embody the personalized digital TV application.

The extraction of the execution data based on the control profile will be described in latter portion of specification.

Moreover, the control node included in the control profile includes an identification information of the corresponding execution data, and is configured to extract the execution data based thereon.

In addition, a first control node may be associated with the corresponding execution data in order to extract the execution data to be transmitted to the receiver.

Moreover, the first control node included in a first control profile may be associated with a second control profile.

In addition, the first control node may be associated with a second control node included the second control profile.

The association may be embodied by expressing the control profile or the control node as an identifier and representing the identifier as a link.

A detailed description will be given with reference to FIG. 4. When a configuration wherein a first control node included in a first control profile is associated with a second control profile or a second control node in the second control profile is employed, the limitation of the conventional art may be overcome. Therefore, the digital TV application for so-called "mega channel service" may be embodied.

Thereafter, the application providing server receives the application requesting event from the receiver that executes and provides the digital TV application (S130).

The application requesting event is generated by the receiver. The application requesting event is a request for the execution data provided by the application providing server in order to execute the digital TV application.

The application requesting event may include at least one of a channel identification information, a device identification information of the receiver, a user identification information of the receiver and the identification information of the execution data.

For instance, when a viewer changes the channel from the channel A to the channel B, the receiver should receive the digital TV application suitable for the channel B. In order to transmit the digital TV application suitable for the channel B, the application providing server requires the channel information of the changed channel.

Therefore, the application requesting event may include the channel identification information that tells which channel is the changed channel.

In addition, the application providing server requires an information of the viewer (user) or the receiver in order to transmit the personalized digital TV application suitable for the viewer.

Accordingly, the application requesting event may include the device identification information of the receiver or the user identification information of the user of the receiver.

Moreover, the receiver may display a scene based on a certain execution data of the digital TV application and switch to another scene. In order to switch to another scene, the receiver request the execution data for another scene. Correspondingly, the application providing server transmits the execution data corresponding to another scene to the receiver.

Accordingly, the application requesting event may include an information of the execution data, i.e. the identification information of the execution data.

After receiving the application requesting event in the step S130, the application providing server extracts one of the plurality of execution data, which is to be transmitted to the receiver, stored in the step S110 (S150).

For instance, when the application requesting event includes at least one of the channel identification information of the channel, the device identification information of the receiver, the user identification information of the receiver and the identification information of the execution data, the application providing server extracts the execution data to be provided to the receiver based on at least one of the informations.

The extraction of the execution data in the step S150 is described in detail below.

In case that the control profile is stored based on the channel, the application requesting event, includes at least one of the channel identification information of a current channel, a user input information within a screen of the current channel and the identification information of the execution data.

Therefore, the application providing server extracts the execution data to be transmitted to the receiver by comparing at least one of the channel identification information of the current channel, the user input information within the screen and the identification information of the execution data included in the application requesting event with the corresponding control node included in the control profile based on the channel.

For instance, when the channel is changed from the channel A to channel B, the receiver transmits the application requesting event including the channel identification information to the application providing server. Thereafter, the application providing server extracts the execution data for an initial screen of the digital TV application corresponding to the channel B by referring to the control profile of the channel B.

Alternately, when the user selects a certain function from the screen while watching the channel B, the receiver transmits the application requesting event including the user input information to the application providing server. Thereafter, the application providing server extracts the execution data for the control node corresponding to the user input information by referring to the control profile for the channel B.

In one embodiment, when the user request a certain execution data while watching the channel B, the receiver transmits the application requesting event including the identification information of the certain execution data to the application providing server. Thereafter, the application providing server extracts the execution data for the control node corresponding to the identification information by referring to the control profile for the channel B.

The similar may be applied to each user group.

In such case, the application requesting event may include at least one of the device identification information of the receiver, the user identification information of the receiver, the user input information within the current channel and the identification information of the execution data.

Therefore, the application providing server extracts the execution data to be transmitted to the receiver by comparing at least one of the device identification information of the receiver, the user identification information of the receiver, the user input information within the current channel and the identification information of the execution data in the application requesting event with the corresponding control node included in the control profile based on user group.

For instance, when the receiver transmits the application requesting event including the user identification information to the application providing server, the application providing server searches for the user group corresponding to the user identification information. When the user identification information belongs to the user group B, the application providing server extracts the execution data for the initial screen of the digital TV application corresponding to an initial connection by referring to the control profile for the user group B.

Alternately, when the user selects the certain function after the receiver executes the execution data, the receiver transmits the application requesting event including the user input information to the application providing server. Thereafter, the application providing server extracts the execution data corresponding to the control node corresponding to the user input by referring to the control profile for the user group B.

In one embodiment, when the user requests the certain execution data after the receiver executes the execution data, the receiver transmits the application requesting event including the identification information of the certain execution data to the application providing server. Thereafter, the application providing server extracts the certain execution data corresponding to the identification information by referring to the control profile for the user group B.

Thereafter, the application providing server transmits the execution data extracted in the step S150 to the receiver (S170).

That is, while the head-end system transmit the entirety of the digital TV application to the receiver in accordance with the conventional method, the application providing server only transmits the execution data extracted in the step S150 to the receiver in accordance with the present invention.

The receiver executes and provides the execution data transmitted in the step S170 by the application providing server. Thereafter, when the receiver requires an additional execution data, the receiver again transmits the application requesting event to the application providing server in the step S130. The receiver then receives the corresponding execution data and provides the received execution data to the viewer.

MODE FOR THE INVENTION

FIG. 2 is a flow diagram exemplifying another method for providing the digital TV application in accordance with the present invention, wherein the method is embodied in the receiver for receiving and providing the execution data from the application providing server.

Referring to FIG. 2, the receiver generates the application requesting event for requesting the execution data divided according to the scene of the digital TV application (S210).

The application requesting event is identical to the application requesting event described with reference to FIG. 1.

That is, the application requesting event may include at least one of the channel identification information of the current channel, the user input information within the screen of the current channel, the device identification information of the receiver, the user identification information of the receiver and the identification information of the execution data.

Thereafter, the receiver transmits the application requesting event generated in the step S210 to the application providing server that provides the digital TV application (S230).

That is, the receiver transmits the application requesting event to the application providing server such that the application providing server may extract a desired execution data.

Thereafter, the receiver receives the execution data transmitted from the application providing server (S250).

The application providing server extracts the execution data corresponding to the application requesting event transmitted in the step S230.

The application providing server extracts the execution data based on the application requesting event including at least one of the channel identification information of the current channel, the user input information within the screen of the current channel, the device identification information of the receiver, the user identification information of the receiver and the identification information of the execution data. The application providing server transmits the extracted execution data to the receiver, and the receiver receives the execution data in the step S250.

Thereafter, the receiver executes the execution data received in the step S250 to provide the digital TV application (S270).

That is, while the receiver receives the entirety of the digital TV application from the head-end system in accordance with conventional art, the receiver only receives the required execution data from the application providing server in accordance with the present invention.

The receiver executes and provides the received execution data. When the receiver requires the additional execution data, the receiver generates the application requesting event for the additional execution data in the step S210.

Thereafter, the receiver transmits the application requesting event to the application providing server in the step S230. The receiver then receives the corresponding additional execution data and provides the received additional execution data to the viewer.

Therefore, the problem of the conventional method for providing the digital TV application may be overcome, and so-called "mega channel service" may be embodied.

FIG. 3 is a diagram illustrating a concept of providing the digital TV application between the application providing server and the receiver in accordance with the method for providing a digital TV application of the present invention.

Referring to FIG. 3, a plurality of data 110a through 110n, a plurality of control profiles 130a through 130m and a model 210 are shown.

The plurality of data 110a through 110n and the plurality of control profiles 130a through 130m are embodied in the application providing server.

The plurality of data 110a through 110n correspond to the executable code, the display data or resource data. The plurality of data 110a through 110n may include an information of the initial screen, additional screen of the digital TV application, i.e. an information of the scene or the resource.

The plurality of control profiles 130a through 130m selects and provides the plurality of data 110a through 110n according to a request from the model 210.

For instance, the plurality of control profiles 130a through 130m extracts the execution data of the digital TV application from the plurality of data 110a through 110n and carries out a control for a screen configuration.

The plurality of control profiles 130a through 130m carry out the extraction of the digital TV application for each channel or the extraction a personalized digital TV application based on the device identification information or the user identification information. In addition, each of the plurality of control profiles 130a through 130m is capable of associating with other control profiles.

The model 210 may include a property 213 and a control profile dispatcher 216, and may be embodied in the receiver or the application providing server.

While the model 210 may be embodied in the head-end system, a problem may occur due to the head-end system. Therefore, it is preferable that the model 210 is embodied in the receiver or the application providing server.

The model 210 includes an information such as a predetermined property and a predetermined specification rather than a variable property. That is, the model 210 is a configuration for processing the digital TV application. The model 210 may comprise an information of a property 213 of the digital TV application or a control profile dispatcher 216.

The property 213 may include an information of the execution of the digital TV application. The control profile dispatcher 216 may include an information of a control of the plurality of control profiles 130a through 130m.

FIG. 4 is a diagram exemplifying the concept of the control profile in accordance with the method for providing the digital TV application of the present invention.

Referring to FIG. 4, three control profiles 130a through 130c are shown.

Each of the control profiles 130a through 130c comprises a plurality of control nodes, and each of the control nodes are denoted as a circle.

For instance, let the control profile 130a be assumed as a profile for a channel A, the control profile 130b be assumed as a profile for a channel B, and the control profile 130c be assumed as a profile for a channel C.

In accordance with conventional art, the digital TV application is executed independently for each channel.

Therefore, only the digital TV application designated for the channel A is executable in the channel A, and the digital TV application designated for the channel C is not executable. In addition, since the entirety of the digital TV application is received and executed, the size and a function of the digital TV application are limited.

However, in accordance with the present invention, the digital TV application is divided into the plurality of execution data according to the scene and the digital TV application for each of the designated channels is associated with each other such that the limitation of the size and the function of the digital TV application is minimized.

For instance, a low-ranking control node 135a of the control profile 130a for the channel A may be associated with an intermediate-ranking control node 135b of the control profile 130b for the channel B.

Accordingly, the execution of the digital TV application while watching the channel A may be switched to a screen provided by executing the digital TV application for the channel B based on the user input.

This is referred to as a scene-to-scene jumping hereinafter.

Therefore, a design of providing the digital TV application for one channel may be carried out by considering the digital TV application for another channel.

In addition, an intermediate-ranking control node 135c of the control profile 130c for the channel C may be associated with a top-ranking control node 135b of the control profile 130b for the channel B in order to enable the scene-to-scene jumping.

On the other hand, the association may be expressed through an identifier.

For instance, the control profile 130a for the channel A may be expressed as "ncfc://ChaA" and the control profile 130b for the channel B as "ncfc://ChaB".

In addition, the low-ranking control node 135a of the control profile 130a may be expressed as "ncfc://ChaA/A/AA", and the intermediate-ranking control node 135b of the control profile 130b as "ncfc://ChaB/B".

The identifier is configured to correspond to the execution data, i.e. one of the plurality of data 110a through 110n of FIG. 3.

When an event corresponding to the low-ranking control node 135a occurs, the scene-to-scene jumping to the intermediate-ranking control node 135b of the control profile 130b because the low-ranking control node 135a is associated with the intermediate-ranking control node 135b of the control profile 130b.

In order to achieve this, the low-ranking control node 135a of the control profile 130a may be linked to "ncfc://ChaB/B", and the execution data corresponding to the intermediate-ranking control node 135b of the control profile 130b may thus be expressed.

In addition, the control profile may be configured according to a function thereof instead of the channel. While only the entirety of the digital TV application is executable in accordance with the conventional art, the digital TV application having various functions may be created by dividing the digital TV application into the plurality of execution data according to the function having the association with each other, i.e. by generating the plurality of control profiles capable of the scene-to-scene jumping.

The above-described configuration is useful when a portal function is embodied by the digital TV application.

For instance, in accordance with the conventional method, the size of the digital TV application is increased when the portal service function is embodied by the single digital TV application. therefore, the receiver cannot provide the digital TV application due to the excessive receiving time and the limited resources.

However, in accordance with the present invention, because the portal service function is embodied by dividing into the plurality of execution data, the drawback due to the excessive receiving time and the limited resources is overcome.

For instance, each portal service function such as the T-commerce function, the game function, the stock service function and the financial service function is divided into the execution data.

Accordingly, the receiver receives and provides the desired execution data based on the control profile for the portal service function.

Even when such configuration is employed, the digital TV application is executable without being limited by a resource of the receiver because each function is executed based on the scene-by-scene execution data.

While the present invention has been particularly shown and described with reference to the preferred embodiment thereof, it will be understood by those skilled in the art that various changes in form and details may be effected therein without departing from the spirit and scope of the invention as defined by the appended claims.

INDUSTRIAL APPLICABILITY

As described above, the digital TV application including various functions may be easily embodied using the scene-to-scene jumping.

In addition, the transmission time and the loading time of the mobile application and the limitation on the number and a size of the mobile application are minimized using the scene-to-scene jumping in accordance with the method for providing the mobile application.

Moreover, the personalized mobile application may be provided based on the device identification information of the receiver or the user information.

The invention claimed is:

1. A method for providing a digital TV application in an application providing server for providing the digital TV application, the method comprising steps of:
   (a) dividing the digital broadcasting application into a plurality of execution data and storing the plurality of execution data;
   (b) receiving an application requesting event transmitted from a receiver, the receiver executing and providing the digital broadcasting application;
   (c) extracting one of the plurality of execution data to be provided to the receiver, the extracted execution data corresponding to the application requesting event;
   (d) transmitting the execution data extracted in the step (c) to the receiver; and
   (e) storing a plurality of control profiles including a plurality of control nodes corresponding to a plurality of scenarios for the application requesting event,
   wherein the step (c) comprises extracting one of the plurality of the execution data to be provided to the receiver based on one of the plurality of control profiles suitable for the application requesting event,
   wherein a first control node included in a first control profile of the plurality of control profiles is associated with a second control node included in a second control profile different from the first control profile, the first control node being a low-ranking control node of the first control profile and the second control node being an intermediate-ranking control node of the second control profile.

2. The method in accordance with claim 1, wherein each of the plurality of the execution data includes at least one of an executable code, a display data and a resource data for an initial screen of the digital TV application.

3. The method in accordance with claim 1, wherein the step (b) comprises: (b-1) receiving the application requesting event including at least one of a channel identification information for a channel, a device identification information for the receiver, a user identification information for a user of the receiver, and an identification information for the execution data.

4. The method in accordance with claim 3, wherein the step (c) comprises (c-1) extracting one of the plurality of the execution data to be provided to the receiver based on at least one of the channel identification information, the device identification information, the user identification information and the identification information for the execution data.

5. The method in accordance with claim 1, wherein the control node includes an identification information for one of the plurality of the execution data to be provided to the receiver.

6. The method in accordance with claim 1, wherein each of the plurality of the control profile or each of the plurality of the control node is represented by an identifier, and the association is represented in a form of a link to the identifier.

7. The method in accordance with claim 1, wherein an event corresponding to the first control node occurs, a scene-to-scene jumping to the second control node is implemented.

8. A method for providing a digital TV application in a receiver for receiving providing the digital TV application, the method comprising steps of:
   (a) generating an application requesting event for requesting an execution data, the execution data classified according to a scene of the digital TV application for executing the digital TV application;
   (b) transmitting the application requesting event to the application providing server for providing the digital broadcasting application;
   (c) receiving the execution data corresponding to the application requesting event transmitted from the application providing server;
   (d) executing the execution data to provide the digital TV application;
   (e) storing a plurality of control profiles including a plurality of control nodes corresponding to a plurality of scenarios for the application requesting event; and
   (f) extracting the execution data to be provided to the receiver based on one of the plurality of control profiles suitable for the application requesting event,
   wherein a first control node included in a first control profile of the plurality of control profiles is associated with a second control node included in a second control profile different from the first control profile, the first control node being a low-ranking control node of the first control profile and the second control node being an intermediate-ranking control node of the second control profile.

9. The method in accordance with claim 8, wherein the step (a) comprises: (a-1) generating the application requesting event including at least one of a channel identification information of a current channel, a user input information within the current channel, a device identification information of the receiver, a user identification information of a user of the receiver, and an identification information of the execution data.

10. The method in accordance with claim 8, wherein the execution data includes at least one of an executable code, a display data and a resource data for the scene of the digital TV application.

11. The method in accordance with claim 8, wherein an event corresponding to the first control node occurs, a scene-to-scene jumping to the second control node is implemented.

* * * * *